United States Patent [19]
Wujek

[11] Patent Number: 5,288,972
[45] Date of Patent: Feb. 22, 1994

[54] WELDING GUN TIP

[75] Inventor: Thomas T. Wujek, Bay City, Mich.

[73] Assignee: American Power Connection Systems, Inc., Bay City, Mich.

[21] Appl. No.: 7,768

[22] Filed: Jan. 22, 1993

[51] Int. Cl.$^5$ .............................................. B23K 9/24
[52] U.S. Cl. .................................................. 219/137.61
[58] Field of Search .................................... 219/137.61

[56] References Cited
U.S. PATENT DOCUMENTS
3,502,841  3/1970  Heer ................. 219/137.61
FOREIGN PATENT DOCUMENTS
2440808  6/1980  France ............. 219/137.61

OTHER PUBLICATIONS
Alex Binzel Corp., pp. 86-87, contact tips.
Tweeco Co., p. 14, contact tips.

Primary Examiner—Clifford C. Shaw
Attorney, Agent, or Firm—Learman & McCulloch

[57] ABSTRACT

A welding gun tip has an axial passage therethrough for the accommodation of a welding wire which extends through and projects beyond the free end of the welding tip. At the free end of the welding tip is an annular guide through which the welding wire extends. The guide is formed of material which is sufficiently harder than that from which the welding wire is formed to prevent the formation of a groove or channel in the guide as a result of movement of the welding wire relative to the welding tip. The guide is formed of dielectric material so as to avoid arcing between the welding wire and the welding tip.

18 Claims, 1 Drawing Sheet

WELDING GUN TIP

This invention relates to a welding gun tip of the kind through which a welding wire extends and more particularly to a welding gun tip having a guide through which the welding wire extends to avoid erosion of the tip.

BACKGROUND OF THE INVENTION

Welding guns of the type having a replaceable tip and an axial passage through which a welding wire extends are in wide usage, particularly in automatic or robotic welding machines. The welding wire typically is fed through the welding gun and the tip from a coil of such wire. Although that portion of the wire which extends through the tip is substantially straight during its passage through the tip, that portion of the wire which projects beyond the tip tends to retain some residual curvature as a result of its being withdrawn from a coil. The residual curvature of the wire causes it to bear against the edge of the tip defining the wire-accommodating passage. Since the welding wire usually is formed of metal which is harder than that forming the tip, movement of the wire through the tip soon causes the wearing of a groove in the tip adjacent its free end. Such groove causes that portion of the welding wire which extends from the free end of the tip to occupy a position to one side of the longitudinal axis of the tip. Consequently, movement of the tip toward an article to be welded causes the free end of the welding wire to engage the workpiece at a position to one side of the intended point of engagement. This results in inaccurate welding and, in some instances, improper welding of the workpiece.

Another problem encountered with conventional welding tips of the kind referred to is that repeated welding operations using a welding wire that is not accurately located with respect to the workpiece can result in arcing between the welding wire and the tip and electrical discharge machining of the tip adjacent the passage through which the welding wire extends. Such machining is undesirable inasmuch as it further deforms the wire-accommodating passage in the welding tip, thereby introducing further errors in the positioning of the free end of the welding wire with respect to the workpiece that is to be welded.

The problems associated with conventional welding tips are well known. However, there does not appear to have been any real solution proposed to the problems other than that of periodically replacing a worn welding tip with a new one so as to overcome for a limited time the disadvantages flowing from a laterally displaced welding wire. In some factories welding tips are replaced at the beginning of each shift by the person or persons responsible for the welding operations. Although conventional welding tips are not expensive, the time required to replace the tips, coupled with the consequent unproductive time of the welding machine during tip replacement, represents significant costs.

The object of the present invention is to provide a welding tip which overcomes the disadvantages described above, thereby greatly extending the useful life of such a welding tip.

SUMMARY OF THE INVENTION

A welding tip constructed in accordance with the invention comprises an elongate body adapted for removable connection to one end of a welding gun and having an axially extending passage therein through which a welding wire extends. At the free end of the tip-forming body is a counter-bore in which is secured an annular guide having an opening that is coaxial with the wire-accommodating passage in the tip body and through which the welding wire extends.

The guide is formed of a material which is considerably harder than that from which the welding wire or the tip body itself is formed, thereby ensuring that movement of the wire through the guide will not cause erosion or abrading of the guide.

That side of the guide which faces inwardly from the free end of the tip tapers so as to facilitate the insertion of the welding wire in the opening in the guide.

The guide preferably is formed of nonconductive material so as to avoid electrical discharge machining of the guide.

THE DRAWINGS

THE PREFERRED EMBODIMENT

Figure 1:
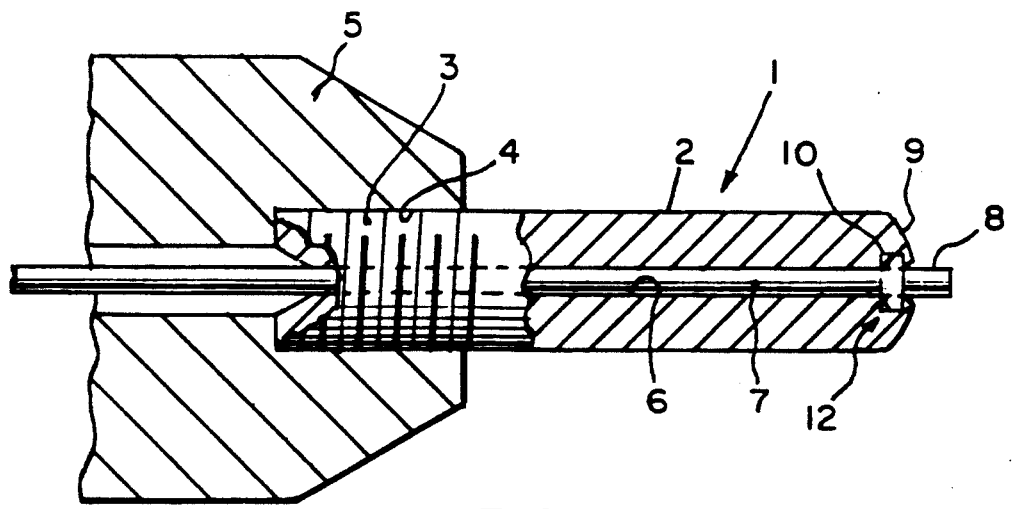
FIG. 1 is a fragmentary, sectional view illustrating a welding gun in which is accommodated a welding tip constructed in accordance with the invention.
Figure 2:
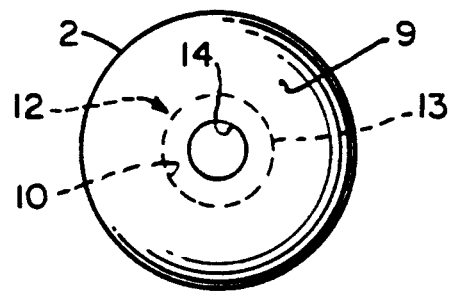
FIG. 2 is an enlarged, end elevational view of the tip shown in FIG. 1.
Figure 3:
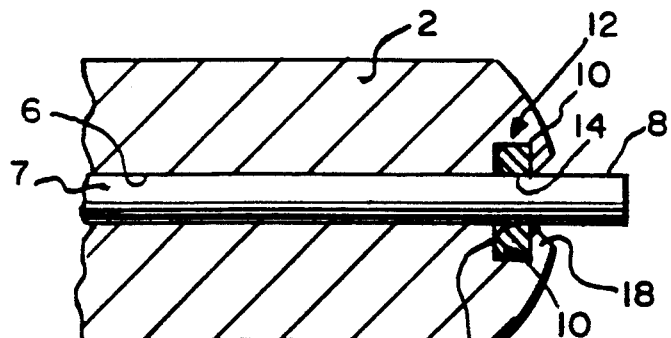
FIG. 3 is a greatly enlarged, fragmentary view of a portion of the welding tip.
Figure 4:
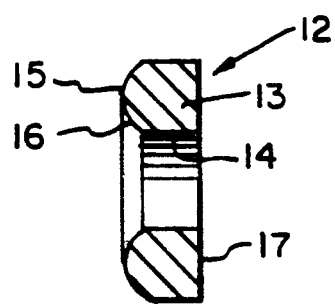
FIG. 4 is an enlarged, transverse sectional view of a guide constructed in accordance with the invention.

A welding tip constructed in accordance with the invention is designated generally by the reference character 1 and comprises a body 2 formed of a relatively soft material such as copper. One end 3 of the body is threaded for removable accommodation in a threaded bore 4 at one end of a welding gun 5, as is conventional. The body 2 has an axial passage 6 extending therethrough and is of such diameter as freely to accommodate a welding wire 7 which is unwound from a coil thereof (not shown) and has a free end 8 which projects beyond the free end 9 of the tip body 2 for engagement with a workpiece, as also is conventional.

At the free end 9 of the body 2 is a counterbore 10 having a flat base 11. Accommodated in the counterbore 10 is a guide 12 comprising an annular body 13 having a central opening 14 therethrough. The inner side 15 of the guide 12, i.e., the side which confronts and seats on the recess base 11, is convexly arcuate or crowned, thereby providing a tapered welding wire inlet 16 to the opening 14. The opposite or outer surface 17 of the guide 12 may be flat.

The guide 12 may be maintained in fixed position within the counterbore 10 in any suitable manner, such as by peening the outer end of the body 2 to provide a lip 18 which overlies and bears against the outer surface 17 of the guide.

The size and configuration of the opening 14 through the guide should be such as freely to accommodate the wire 7, thereby enabling the wire 7 to be advanced incrementally through the passage 6 in the conventional manner. If desired, the cross-sectional area of the opening 14 may be slightly less than that of the bore 6 so as to minimize as much as possible any engagement between the wire and the surface of the bore.

The material from which the guide 12 is formed is considerably harder than that forming the body 2 or the welding wire 7. The material from which the guide 12 is formed preferably is a synthetic or genuine gemstone such as ruby, sapphire, or diamond, or any other suitable corundum.

The hardness of the material from which the guide 12 is formed precludes the forming of any groove or channel as a result of movement of the wire 7 through the tip body 2. Consequently, the tip 8 of the wire 7 will not be displaced from the longitudinal axis of the body 2. Use of a nonconductive material in the formation of the guide 12 eliminates or minimizes the possibility of arcing and electrical discharging machining of the bore of the body 2.

The disclosed embodiment is representative of a presently preferred form of the invention, but is intended to be illustrative rather than definitive thereof. The invention is defined in the claims.

I claim:

1. A welding tip comprising a body having an axial passage therein through which a welding wire may extend; an annular guide having an opening therethrough; and means securing said guide to said body at one end thereof with said opening coaxial with said passage so that said welding wire may extend through said opening, said guide being formed of gemstone material having a hardness greater than that of the material forming said welding wire.

2. The welding tip according to claim 1 wherein said guide is formed of dielectric material.

3. The welding tip according to claim 1 wherein said opening is tapered in a direction outwardly of said one end of said body.

4. The welding tip according to claim 1 wherein one surface of said guide is crowned.

5. The welding tip according to claim 1 wherein said one surface of said guide is its inward surface.

6. The welding tip according to claim 1 wherein said one end of said body has a counterbore in communication with said passage, said guide being accommodated in said counterbore.

7. The welding tip according to claim 6 wherein said counterbore has a flat surface base.

8. The welding tip according to claim 7 wherein said guide has a crowned surface confronting and seating on said flat base.

9. The welding tip according to claim 1 wherein said material of said guide is selected from the class consisting of diamond, ruby, and sapphire.

10. The welding tip according to claim 1 wherein said guide has an inner, crowned surface, the crown of said surface forming a tapered inlet to said opening.

11. The welding tip according to claim 1 wherein said body has a counterbore at said one end of said body coaxial with said passage, said securing means comprising a lip at said one end of said body overlying said guide but terminating short of said opening.

12. The welding tip according to claim 1 wherein said opening in said guide is of such size and shape as freely and slideably to accommodate said welding wire.

13. The welding tip according to claim 12 wherein said opening and said passage have substantially uniform cross-sectional areas.

14. The welding tip according to claim 12 wherein said opening has a cross-sectional area less than that of said passage.

15. A welding tip comprising a body having an axial passage therein through which a welding wire may extend; an annular guide having an opening therethrough; and means securing said guide to said body at one end thereof with said opening coaxial with said passage so that said welding wire may extend through said opening, said guide being formed of dielectric material having a hardness at least as great as that of a gemstone and greater than that of the material forming said welding wire.

16. A welding tip comprising a body having an axial passage therein through which a welding wire slideably may extend in a direction toward one end of said body; an annular guide having an opening therethrough; and means securing said guide to said body at said one end thereof with said opening coaxial with said passage so that said welding wire may pass through said opening beyond said one end of said body, said guide being formed of dielectric material having a hardness greater than that of the material forming said welding wire, and said opening having a cross-sectional area less than that of said passage.

17. The welding tip according to claim 16 wherein said guide is accommodated in a counterbore formed in said body at said one end thereof.

18. The welding tip according to claim 16 wherein said guide is formed of material having a hardness corresponding to that of a gemstone.

* * * * *